United States Patent
Watanabe et al.

(10) Patent No.: US 9,442,785 B2
(45) Date of Patent: Sep. 13, 2016

(54) FAULT SYMPTOM DETECTION METHOD AND INFORMATION PROCESSING APPARATUS

(71) Applicant: FUJITSU LIMITED, Kawasaki-shi, Kanagawa (JP)

(72) Inventors: Yukihiro Watanabe, Kawasaki (JP); Yasuhide Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 146 days.

(21) Appl. No.: 14/540,398

(22) Filed: Nov. 13, 2014

(65) Prior Publication Data

US 2015/0154062 A1   Jun. 4, 2015

(30) Foreign Application Priority Data

Dec. 2, 2013 (JP) ................................ 2013-249027

(51) Int. Cl.
*G06F 11/30* (2006.01)
*G06F 11/07* (2006.01)

(52) U.S. Cl.
CPC ....... *G06F 11/0751* (2013.01); *G06F 11/0727* (2013.01)

(58) Field of Classification Search
CPC .......................... G06F 11/2257; G06F 11/3452
USPC .................................................. 714/26, 37
See application file for complete search history.

(56) References Cited

U.S. PATENT DOCUMENTS

| | | | |
|---|---|---|---|
| 6,353,902 B1 * | 3/2002 | Kulatunge | H04L 41/06 714/47.3 |
| 8,370,108 B2 * | 2/2013 | Fujimaki | G05B 23/0281 702/182 |
| 2006/0136205 A1 * | 6/2006 | Song | G06K 9/6277 704/243 |
| 2010/0131800 A1 * | 5/2010 | Fujimaki | G05B 23/0281 714/37 |
| 2010/0325489 A1 * | 12/2010 | Nakadai | G06F 11/0748 714/26 |
| 2012/0166879 A1 * | 6/2012 | Watanabe | G06F 11/0751 714/37 |
| 2012/0290879 A1 | 11/2012 | Shibuya et al. | |
| 2014/0172371 A1 * | 6/2014 | Zhu | G06F 11/079 702/185 |
| 2016/0124792 A1 * | 5/2016 | Togawa | G06F 11/079 714/37 |

FOREIGN PATENT DOCUMENTS

JP    2011-070635    4/2011

* cited by examiner

*Primary Examiner* — Chae Ko
(74) *Attorney, Agent, or Firm* — Fujitsu Patent Center

(57) ABSTRACT

An information processing apparatus determines first message types that are not used for learning, on the basis of the appearance frequencies of individual message types obtained using a set of collected messages, and learns a message pattern which appears when a fault occurs and from which the first message types have been removed, from the set of messages and fault information. The information processing apparatus determines second message types that are not used for detection, on the basis of the appearance frequencies of individual message types obtained using a set of collected messages, generates a message pattern, from which the second message types have been removed, from the set of messages, and compares the message patterns with each other to detect a fault symptom in a system.

6 Claims, 19 Drawing Sheets

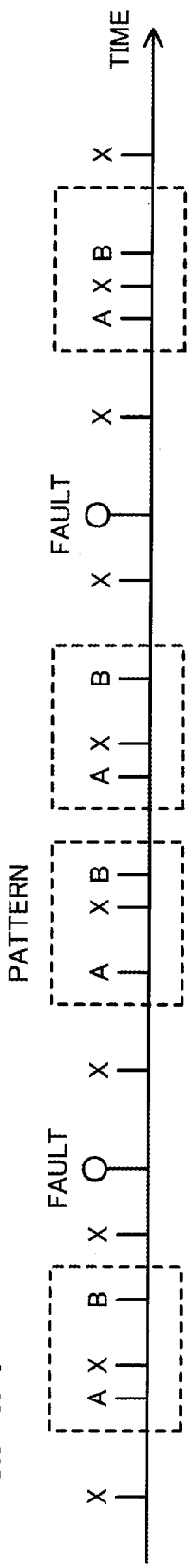
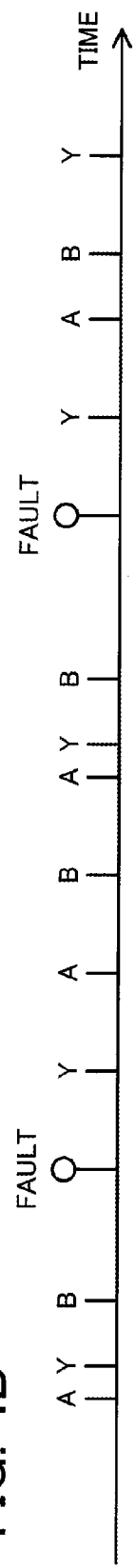
FIG. 4A ON LEARNING
FIG. 4B ON DETECTION

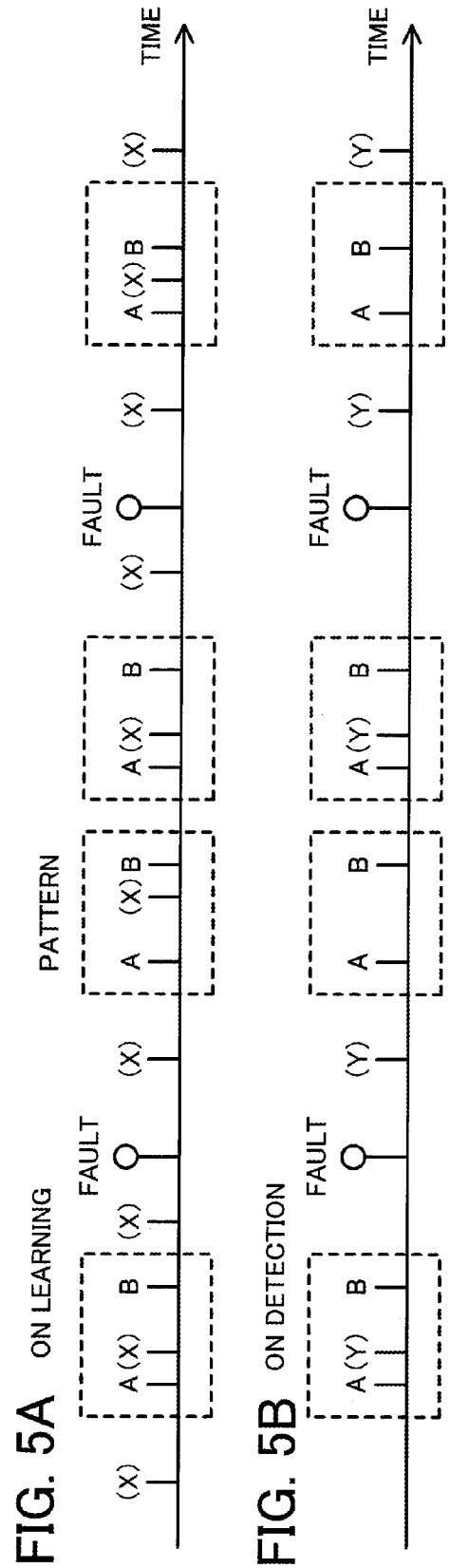

MESSAGE TABLE                                     141

| TIME | TYPE | MESSAGE |
| --- | --- | --- |
| 2012-03-13 10:31:02 | 1 | RAID: Adapter missing after reboot ... |
| 2012-03-13 10:35:28 | 3 | Correctable error count overflow ... |
| 2012-03-13 10:36:18 | 10 | Disk(4) missing after reboot ... |
| ⋮ | ⋮ | ⋮ |

FIG. 8

FREQUENCY TABLE 142

| TYPE | APPEARANCE COUNT | TOTAL | FREQUENCY | SCORE |
|---|---|---|---|---|
| 1 | 20 | 102204 | 1.96e-04 | 5110.2 |
| 2 | 60215 | 102204 | 0.589 | 1.7 |
| 3 | 1503 | 102204 | 0.015 | 68.0 |
| 4 | 5805 | 102204 | 0.057 | 17.6 |
| ⋮ | ⋮ | ⋮ | ⋮ | ⋮ |

FIG. 9

USER SETTING TABLE      143

| TYPE | EXCEPTION FLAG | NON-EXCEPTION FLAG |
|---|---|---|
| 11 | 1 (True) | 0 (False) |
| 13 | 0 (False) | 1 (True) |
| ⋮ | ⋮ | ⋮ |

FIG. 10

FAULT TABLE                                144

| TIME | FAULT |
| --- | --- |
| 2012-03-02 02:42:01 | HDD FAILURE |
| 2012-03-05 13:35:21 | PERFORMANCE DEGRADATION |
| 2012-03-06 07:22:50 | NO RESPONSE FROM WEB SERVER |
| ⋮ | ⋮ |

FIG. 11

LEARNING TABLE                                                145

| PATTERN | FAULT | APPEARANCE COUNT | SYMPTOM COUNT | CO-OCCURRENCE PROBABILITY |
|---|---|---|---|---|
| [1, 3, 4, 7, 9] | HDD FAILURE | 165 | 137 | 0.83 |
| [1, 4, 6, 10, 12] | PERFORMANCE DEGRADATION | 120 | 108 | 0.90 |
| [3, 7, 11, 14] | HDD FAILURE | 25 | 22 | 0.88 |

FIG. 12

PERIOD TABLE 146

| PERIOD | START TIME | END TIME |
|---|---|---|
| 1 | 2012-03-13 05:00:02 | 2012-03-14 00:30:28 |
| 2 | 2012-03-14 05:00:01 | 2012-03-15 00:31:01 |
| 3 | 2012-03-15 05:00:06 | 2012-03-16 00:30:15 |
| ⋮ | ⋮ | ⋮ |

FIG. 17

FAULT SYMPTOM DETECTION METHOD AND INFORMATION PROCESSING APPARATUS

CROSS-REFERENCE TO RELATED APPLICATION

This application is based upon and claims the benefit of priority of the prior Japanese Patent Application No. 2013-249027, filed on Dec. 2, 2013, the entire contents of which are incorporated herein by reference.

FIELD

The embodiments discussed herein relate to a fault symptom detection method and an information processing apparatus.

BACKGROUND

Currently used information processing systems include a variety of electronic devices, such as server apparatuses, storage, communication apparatuses, etc. Such an information processing system may experience faults, such as Hard Disk Drives (HDD) failures, communication interface failures, etc. Therefore, a monitoring apparatus may be provided so as to monitor the operating state of the information processing system by collecting various types of messages from electronic devices. For example, when the monitoring apparatus detects a fault from the collected messages, the monitoring apparatus may lead an administrator to replace a server apparatus in use or change a communication route.

Some of such monitoring apparatuses may detect a fault symptom on the basis of collected messages before a fault occurs. For example, when detecting an increase in the number of failures in writing to HDD or a rapid increase in communication delay, a monitoring apparatus may inform an administrator of this matter as a fault symptom. This allows the administrator to take some countermeasures, such as replacement of a server apparatus, changing of a communication path, etc., before a fault actually occurs, which results in reducing the halt time of information processing and minimizing the impact of the fault.

As one example, there is provided a facility state monitoring method for detecting a fault symptom on the basis of data collected from facility, such as a plant or the like. This facility state monitoring method includes a learning phase for creating a normal model that represents the normal state of the facility, and an evaluation phase for detecting a fault symptom on the basis of the normal model and data collected from the facility. In the learning phase, a feature vector is created as the normal model from data obtained during a normal time. In the evaluation phase, a feature vector is created from currently collected data, and is then compared with the normal model. In the case where an "anomaly measurement" according to the distance of the feature vector is greater than or equal to a threshold, it is determined that there is a fault symptom in the facility.

Please see, for example, Japanese Laid-open Patent Publication No. 2011-70635.

One of methods considered for detecting fault symptoms is to learn message patterns that appeared when faults occurred in the past, and to determine that there is a fault symptom if any of the learned message patterns appears in a set of collected messages. Each message pattern to be learned is a combination of message types that appear with high probability within a predetermined time period before the occurrence of a fault. This detection method, however, has a following problem.

Messages collected from a monitored information processing system may include messages that have a low relevance to faults and that are successively generated as noise. For example, messages including mild warning information, which may be ignored by an administrator, may periodically be generated, like messages that are generated because a function of monitoring an unused communication interface is active. The types of messages that are collected as noise may change according to changes in the operating state of an information processing system, such as changes in the configuration of the information processing system, changes in business processes using the information processing system, etc. For example, noise is reduced by deactivating the function of monitoring an unused communication interface.

If a lot of noise is included in collected messages, the noise may be mixed in the result of learning message patterns indicating fault symptoms. If the types of messages that are successively generated as noise change from those that appeared at the time of learning, the message patterns obtained as the results of learning may not appear in collected messages. This causes a problem of failing to detect fault symptoms on the basis of the existing learning results. To deal with this, there is an idea of deleting the existing learning results and newly learning message patterns. However, re-learning message patterns each time the operating state of the information processing system is changed causes problems of increasing the load due to the re-learning and degrading the accuracy of fault symptom detection.

SUMMARY

According to one aspect, there is provided a fault symptom detection method in collecting a plurality of types of messages from a monitored system. The method include: determining, by a processor, a first message type that is not used for learning, based on appearance frequencies of individual message types obtained using a first set of messages collected; learning, by the processor, a first message pattern, from which the first message type has been removed, from the first set of messages and fault information, the first message pattern being a message pattern that appears when a fault occurs, the fault information indicating occurrence of faults in the monitored system; determining, by the processor, a second message type that is not used for detection, based on appearance frequencies of individual message types obtained using a second set of messages collected after the first set of messages; generating, by the processor, a second message pattern, from which the second message type has been removed, from the second set of messages; and comparing the first message pattern with the second message pattern to detect a fault symptom in the monitored system.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 4A and 4B illustrate an example of the impact of background noise in symptom detection;

FIGS. 5A and 5B illustrate an example of removing the background noise in symptom detection;

FIG. 8 illustrates an example of a message table;

FIG. 9 illustrates an example of a frequency table;

FIG. 10 illustrates an example of a user setting table;

FIG. 11 illustrates an example of a fault table;

FIG. 12 illustrates an example of a learning table;

FIG. 17 illustrates an example of a period table;

DESCRIPTION OF EMBODIMENTS

Figure 1:
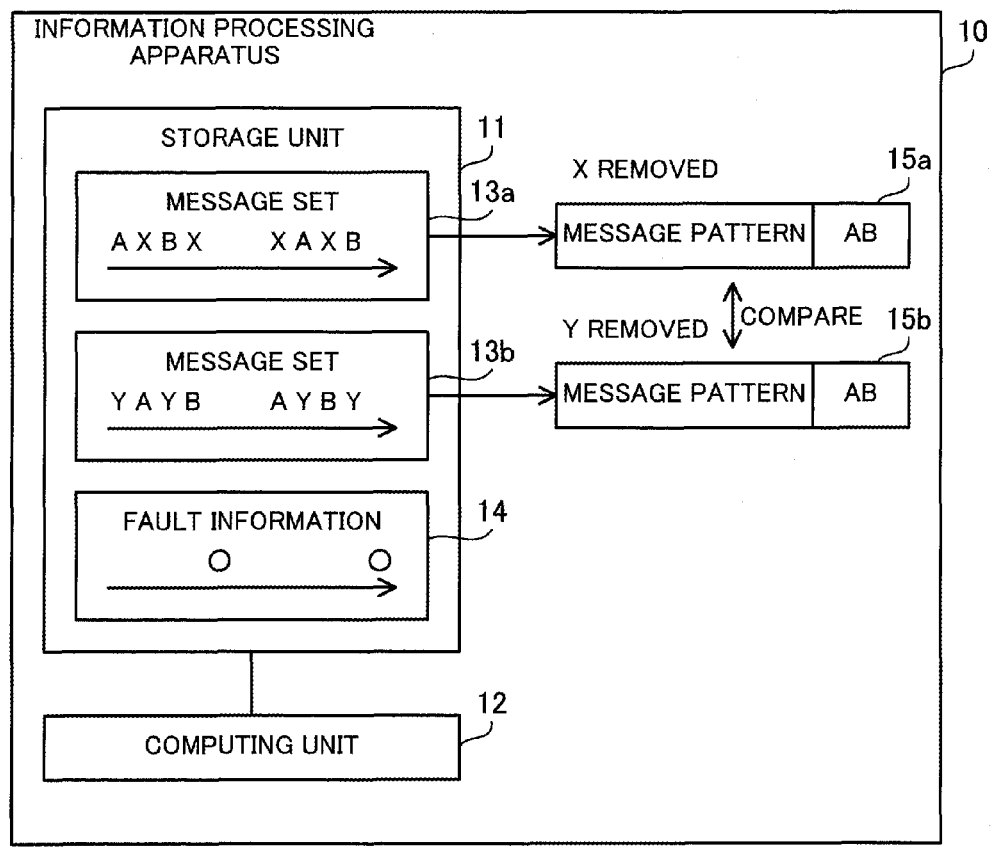
FIG. 1 illustrates an information processing apparatus according to a first embodiment.

Several embodiments will be described below with reference to the accompanying drawings, wherein like reference numerals refer to like elements throughout.

First Embodiment

FIG. 1 illustrates an information processing apparatus according to a first embodiment.

An information processing apparatus 10 of the first embodiment collects a plurality of types of messages from a monitored system and detects a fault symptom in the system on the basis of the collected messages. The monitored system includes one or more electronic devices. The monitored system may include a plurality of kinds of electronic devices, such as server apparatuses, storage, communication apparatuses, etc. A set of messages collected by the information processing apparatus 10 may be a mix of messages from two or more kinds of electronic devices. The information processing apparatus 10 may be called a computer. The information processing apparatus 10 may be a server apparatus (for example, a so-called server computer) or a terminal device operated by a user (for example, a so-called client computer).

The information processing apparatus 10 includes a storage unit 11 and a computing unit 12. The storage unit 11 may be volatile storage device, such as a Random Access Memory (RAM), etc., or a non-volatile storage device, such as a HDD, etc. The computing unit 12 is, for example, a processor. The processor may be a Central Processing Unit (CPU) or a Digital Signal Processor (DSP), or may include an Application Specific Integrated Circuit (ASIC), a Field Programmable Gate Array (FPGA), or other application specific integrated circuits. The processor executes a program stored in a storage device (for example, the storage unit 11), such as a RAM or the like. A set of two or more processors (multiprocessor) may be called "a processor".

The storage unit 11 stores therein messages sets 13a and 13b and fault information 14.

The message set 13a is a set of messages collected from the monitored system at a certain time point. The message set 13b is a set of messages collected from the monitored system at a certain time point after the message set 13a. The message set 13a may or may not be deleted from the storage unit 11 when the message set 13b is obtained. The message set 13a, in the case of not being deleted, may be treated as log information after the message set 13b is obtained.

The message sets 13a and 13b include messages that do not indicate occurrence of faults but indicate improper performance of electronic devices. The improper performance of electronic devices includes, for example, a failure of access to HDD, a cache overflow, a communication delay, a failure in interface initialization, and so on. A fault may occur with high probability after two or more specific types of messages are generated in the same time period. The message sets 13a and 13b also include messages that have a low relevance to faults and that are generated successively. Such messages may be considered as noise.

The message types considered as noise may change according to changes in the operating state of the monitored system. Changes in the operating state of the system include, for example, changes in the configuration and setting of the system, changes in business processes using the system, and so on. In this first embodiment, the message sets 13a and 13b include different types of messages as noise. Referring to the example of FIG. 1, the message set 13a includes messages of the types A, B, and X, and the message set 13b includes messages of the types A, B, and Y. Messages of the types X and Y are considered as noise. In the following, messages of the types A, B, X, and Y may be referred to as messages A, B, X, and Y, respectively.

The fault information 14 indicates faults that occurred in the past in the monitored system, and includes, for example, information indicating when the faults occurred. The system faults include, for example, hardware faults, such as HDD failures, communication interface failures, etc. The fault information 14 includes at least information about faults that occurred in the time period during which the message set 13a was obtained. The fault information 14 may be entered by a user in the information processing apparatus 10 or may be generated by the information processing apparatus 10 on the basis of messages indicating occurrence of faults collected from the monitored system.

The computing unit 12 learns a message pattern 15a, which appears when a fault occurs, from the message set 13a and the fault information 14. The message pattern 15a indicates, for example, a combination of two or more types of messages that appeared in the past within a predetermined time period before the occurrence of a fault. In addition, the computing unit 12 generates a message pattern 15b from the message set 13b. The message pattern 15b indicates, for example, a combination of two or more types of messages that appeared in the same time period. Then, the computing unit 12 compares the message patterns 15a and 15b with each other to detect a fault symptom. For example, when the message pattern 15b is identical to the message pattern 15a, then the computing unit 12 determines that there is a fault symptom in the monitored system, and issues a warning to the user.

When learning the message pattern 15a, the computing unit 12 calculates the appearance frequency for each message type using the obtained message set 13a. For example, the computing unit 12 counts how many messages are included in the message set 13a for each message type, and calculates the appearance probability for each message type. Then, the computing unit 12 determines message types (for example, message X) that are not used for learning among the plurality of message types, on the basis of the appearance frequencies calculated using the message set 13a. The message types that are not used for learning are, for example, message types whose appearance frequencies are greater than or equal to a threshold. The computing unit 12 removes the determined message types (for example, messages X) from the message pattern 15a.

Similarly, when detecting a fault symptom, the computing unit 12 calculates the appearance frequency for each message type using the obtained message set 13b. For example, the computing unit 12 counts how many messages are included in the message set 13b for each message type, and calculates the appearance probability for each message type. Then, the computing unit 12 determines message types (for example, message Y) that are not used for detection among the plurality of message types, on the basis of the appearance frequencies calculated using the message set 13b. The message types that are not used for detection are, for example, message types whose appearance frequencies are greater than or equal to a threshold. The computing unit 12 removes the determined message types (for example, messages Y) from the message pattern 15b.

The message set 13a includes many messages X as noise. If the messages X are not removed, a message pattern including messages A, B, and X is likely generated through learning. On the other hand, the message set 13b includes many messages Y as noise. If the messages Y are not removed, a message pattern including messages A, B, and Y is likely generated through detection. In this case, it is hard to detect a fault symptom by simply comparing these two message patterns with each other. By contrast, the message patterns 15a and 15b generated as described above do not include the messages X or Y but include the messages A and B, and therefore it is possible to detect a fault symptom through a comparison between these message patterns.

The information processing apparatus 10 of the first embodiment determines the message types that are not used for learning, on the basis of the appearance frequencies of the individual message types obtained at the time of learning, and learns the message pattern 15a, from which the determined message types have been removed. In addition, the information processing apparatus 10 determines the message types that are not used for detection, on the basis of the appearance frequencies of the individual message types obtained at the time of detection, and compares the message pattern 15b, from which the determined message types have been removed, with the learning result. This approach makes it possible to detect a fault symptom using already obtained learning results even in the case where noise in messages changes according to changes in the system configuration or business processes or the like. This results in minimizing the load for re-learning and improving the accuracy of fault symptom detection.

Second Embodiment

Figure 2:
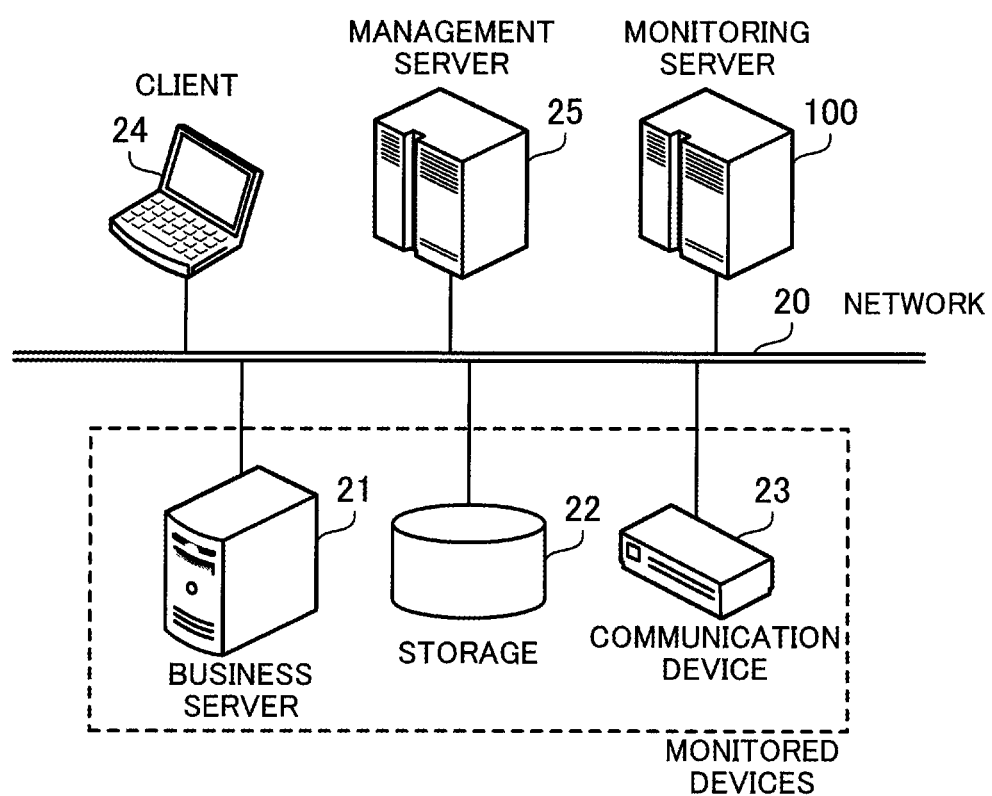
FIG. 2 illustrates an information processing system according to a second embodiment.

FIG. 2 illustrates an information processing system according to a second embodiment.

An information processing system of the second embodiment collectively manages various kinds of electronic devices used in business. This information processing system includes a business server 21, storage 22, a communication device 23, a client 24, a management server 25, and a monitoring server 100. These devices included in the information processing system are connected to a network 20. In this connection, the monitoring server 100 is one example of the information processing apparatus 10 of the first embodiment. The business server 21, storage 22, and communication device 23 are examples of a monitored system.

The business server 21, storage 22, and communication device 23 are examples of electronic devices used in business. The business server 21 is a server computer that executes business application software. The storage 22 is a storage device that stores business-related data in a magnetic disk or another non-volatile storage medium. The storage 22 is accessible from the business server 21. The communication device 23 is a router or switch used for data transfer. The monitored system may include other kinds of electronic devices.

The client 24 is a client computer serving as a terminal device that is operated by an administrator. When the configuration of the monitored system is changed, the client 24 registers the details of the configuration change and the schedule for the change in the management server 25. Examples of the configuration change include addition or removal of a business server, migration of a virtual machine between business servers, update of software installed in the business server 21, setting change of a communication port of the communication device 23, and so on.

When a fault occurs in the monitored system, the client 24 receives warning information indicating the fault from the monitoring server 100. Examples of the fault include a HDD failure in the business server 21 or storage 22, a failure in a communication port of the communication device 23, and so on. The warning information indicating the fault is displayed on the display of the client 24. The administrator operates the client 24 to recover the system. For example, the administrator replaces the business server 21 or storage 22 with a spare business server or storage.

In addition, when there is a fault symptom although any fault has not occurred, the client 24 may receive warning information indicating the fault symptom from the monitoring server 100. Examples of the fault symptom include a combination of improper performances, such as a failure of access to HDD, a cache overflow, a communication delay, a failure in interface initialization, etc. A combination of plural types of performances satisfying prescribed conditions may be considered. The warning information indicating the fault symptom is displayed on the display of the client 24. The administrator may operate the client 24 to reduce the impact of the fault before the fault actually occurs. For example, when there is a fault symptom in the business server 21, the administrator may migrate virtual machines from the business server 21 to another business server before the fault occurs. If there is a fault symptom in the communication device 23, on the other hand, the administrator may change a communication path so as to bypass the communication device 23 before the fault occurs.

The management server 25 is a server computer that changes the configuration of the monitored system in response to instructions from the client 24. When the details of a configuration change and the schedule of the change are registered from the client 24, the management server 25 changes the configuration according to the schedule. For example, the management server 25 updates software installed in the business server 21, changes the setting of a communication port of the communication device 23, or the like on a designated date and time.

The monitoring server 100 is a server computer that monitors the system to check whether a fault has occurred or whether there is a fault symptom. The monitoring server 100 continuously collects messages from the electronic devices belonging to the monitored system. To collect messages, a desired protocol including Simple Network Management Protocol (SNMP) may be used. A set of collected messages may include messages indicating a fault, such as a HDD failure, a communication port failure, etc. In addition, the set of collected messages may include alerting messages indicating not faults but improper performances, such as a failure of access to HDD, a cache overflow, a communication delay, a failure in interface initialization, etc.

The monitoring server 100 detects a fault or a fault symptom on the basis of the collected messages. When detecting a fault, the monitoring server 100 generates warning information indicating the type of the fault, the electronic device in which the fault has occurred, the occurrence time of the fault, etc., and sends the warning information to the client 24. When detecting a fault symptom on the basis of an alerting message, on the other hand, the monitoring server 100 generates warning information indicating the type of the indicated fault, the electronic device in which the fault symptom has occurred, messages from which the symptom has been detected, and the detection time of the symptom, etc., and sends the warning information to the client 24. The warning information may be sent from the monitoring server 100 to the client 24 with a desired protocol, such as an electronic mail.

To detect a fault symptom, the monitoring server 100 learns a combination of message types that appear with high probability within a predetermined time period before a fault occurs, on the basis of a set of previously collected messages. The monitoring server 100 compares currently collected messages with the learning result in real-time, and determines that there is a fault symptom if a series of messages matching the learning result has appeared. The following mainly describes how the monitoring server 100 detects a fault symptom.

Figure 3:
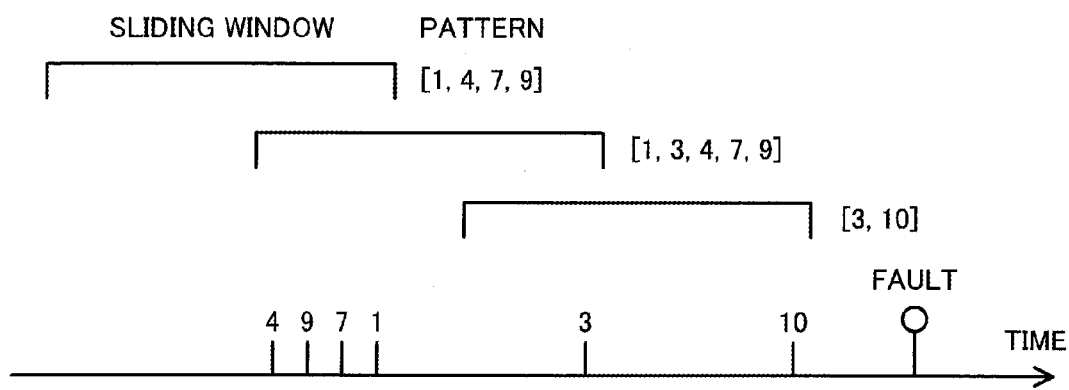
FIG. 3 illustrates an example of how to learn message patterns.

FIG. 3 illustrates an example of how to learn message patterns.

In the second embodiment, a combination of two or more types of messages that appear in the same time period is treated as a message pattern. The monitoring server 100 learns a message pattern having a high correlation with the occurrence of a fault from a set of collected messages. Thereby, the monitoring server 100 is able to find relations between messages and faults, which are hard to detect manually.

The monitoring server 100 appends information indicating the reception time to each message so as to manage collected messages in chronological order. As illustrated in FIG. 3, the monitoring server 100 shifts a sliding window of predetermined time period (for example, five minutes) along the time axis. A combination of message types falling within the sliding window is extracted as a message pattern of messages that appeared in the same time period. At this time, in message patterns, the number of messages of the same type and the order the messages appeared are not considered. That is to say, a message pattern randomly lists the message types that appeared in the same time period.

For example, in the case where messages of types 4, 9, 7, and 1 (hereinafter, referred to as messages 4, 9, 7, and 1) fall within the sliding window at a certain time point, a pattern [1, 4, 7, 9] is extracted. Subsequently, when a message 3 is added to the sliding window, a pattern [1, 3, 4, 7, and 9] is extracted. After that, when a message 10 is added to the sliding window and the messages 4, 9, 7, and 1 get out of the sliding window, a pattern [3, 10] is extracted.

Such message patterns are extracted at the time of learning, and are also extracted in real-time from a set of messages currently collected at the time of symptom detection. At the time of learning, the monitoring server 100 counts, for each pattern, how many times the pattern appeared within a predetermined time period before the occurrence of individual faults, to thereby learn correlations between patterns and occurrence of faults. A pattern that appears within a predetermined time period before the occurrence of a fault satisfies the conditions that, for example, a difference between the reception time of the last (latest) message in the sliding window or the end time of the sliding window and the occurrence time of the fault is less than or equal to a threshold. At the time of symptom detection, the monitoring server 100 compares patterns having high correlations with the occurrence of faults with a pattern extracted in real-time to determine whether they are identical or not.

The following describes a problem that arises at the time of learning patterns having high correlations with the occurrence of faults.

FIGS. 4A and 4B illustrate an example of the impact of background noise in symptom detection.

Messages collected by the monitoring server 100 include messages that have a low relevance to faults and are generated successively. In the second embodiment, such types of messages are treated as "background noise". Since background noise is generated successively, such messages appear more frequently than the other types of messages. Examples of background noise include mild alerting messages that are ignorable by the administrator, like messages that are generated because a function of monitoring unused communication ports is active. In terms of system operation, the administrator may intentionally configure setting so as to generate alerting messages and then ignore the messages.

The message types as background noise may change with time. For example, when the system configuration or a business process using the system is changed, the background noise may change greatly. Examples of a change in a business process include a change of a business procedure from a procedure for directly editing a file stored in the storage 22 by a user to a procedure for editing the file via a Web application program that runs on the business server 21. The system configuration or business process is changed with higher frequency in a larger-scale monitored system. Therefore, there is a possibility that a set of messages used for pattern learning and a set of current messages used for symptom detection include different types of many messages as background noise. Therefore, a following problem arises.

Assume now that a set of messages used for learning includes messages A, B, and X and that a combination of messages A and B appears with high probability immediately before a fault occurs. In addition, assume that a large number of messages X are generated successively as background noise. In this case, if the message X is not removed, the monitoring server 100 learns that a pattern [A, B, X] has a high correlation with the fault because the messages A, B, and X fall within the sliding window.

On the other hand, assume that a set of currently collected messages includes messages A, B, and Y and that a large number of messages Y are generated successively as background noise and no message X is generated. That is, background noise has changed according to a change in the configuration or a business process, or another. In this case, if the messages Y are not removed, the monitoring server 100 extracts a pattern [A, B, Y] because the messages A, B, and Y fall within the sliding window. Since the learned pattern [A, B, X] and the currently extracted pattern [A, B, Y] are not identical, the monitoring server 100 does not detect a fault symptom in this situation.

FIGS. 5A and 5B illustrate an example of removing the background noise in symptom detection.

To solve the above problem, the second embodiment removes background noise obtained through learning from a pattern extracted at the time of learning, and removes background noise obtained through symptom detection from a pattern extracted at the time of symptom detection. There is a possibility that background noise for the symptom detection time is different from that for the learning time. Then, the patterns without the background noise are compared with each other.

For example, the monitoring server 100 detects messages X that have a high appearance frequency from messages used for learning, and determines them as background noise for the learning time. Therefore, the monitoring server 100 learns a pattern [A, B] by removing the messages X. In addition, the monitoring server 100 detects messages Y that have a high appearance frequency from currently collected messages, and determines them as background noise for the symptom detection time. Therefore, the monitoring server 100 extracts a pattern [A, B] by removing the messages Y. Since the learned pattern [A, B] and the currently extracted pattern [A, B] are identical, the monitoring server 100 detects a fault symptom.

The following describes the configuration of the monitoring server 100.

Figure 6:
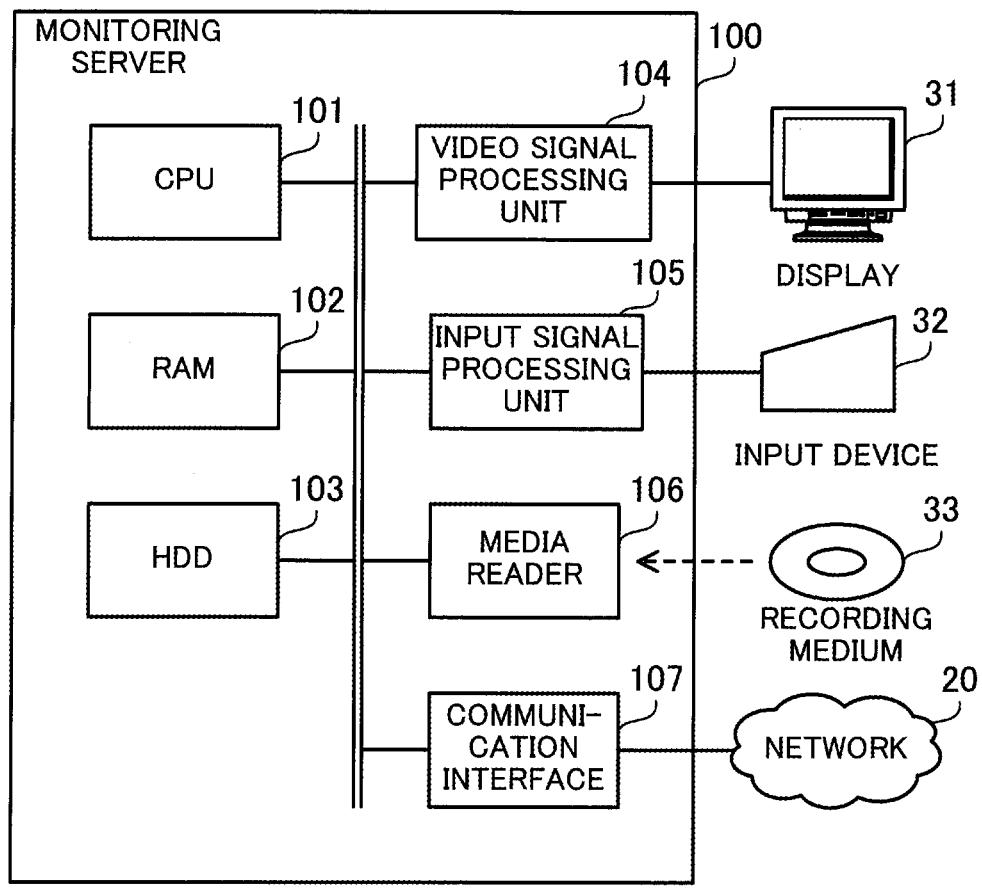
FIG. 6 is a block diagram illustrating an example of the hardware configuration of a monitoring server.

FIG. 6 is a block diagram illustrating an example of the hardware configuration of a monitoring server.

The monitoring server 100 includes a CPU 101, a RAM 102, a HDD 103, a video signal processing unit 104, an input signal processing unit 105, a media reader 106, and a communication interface 107. The CPU 101 is an example of the computing unit 12 of the first embodiment. The RAM 102 or HDD 103 is one example of the storage unit 11 of the first embodiment.

The CPU 101 is a processor including a computing circuit that executes instructions described in a program. The CPU 101 loads at least part of the program and data from the HDD 103 to the RAM 102, and then runs the program. In this connection, the CPU 101 may be provided with a plurality of processor cores, and the monitoring server 100 may be provided with a plurality of processors. Furthermore, the processes, which will be described later, may be performed in parallel using a plurality of processors or processor cores. A collection of a plurality of processors (multiprocessor) may be called "a processor".

The RAM 102 is a volatile memory that temporarily stores therein a program to be executed by the CPU 101 and data to be used in the processing of the CPU 101. In this connection, the monitoring server 100 may be provided with another kind of memory than RAM or with a plurality of memories.

The HDD 103 is a non-volatile storage device that stores therein software programs, such as OS, middleware, application software, etc., and data. In this connection, the monitoring server 100 may be provided with another kind of storage device, such as a flash memory, Solid State Drive (SSD), etc., or with a plurality of non-volatile storage devices.

The video signal processing unit 104 outputs images to a display 31 connected to the monitoring server 100 in accordance with instructions from the CPU 101. As the display 31, a Cathode Ray Tube (CRT) display, a Liquid Crystal Display (LCD), a Plasma Display Panel (PDP), an Organic Electro-Luminescence (OEL) display, or the like may be used.

The input signal processing unit 105 obtains an input signal from an input device 32 connected to the monitoring server 100, and outputs the input signal to the CPU 101. As the input device 32, a pointing device, such as a mouse, a touch panel, a touchpad, a trackball, etc., a keyboard, a remote controller, a button switch, or the like may be used. In addition, a plurality of kinds of input devices may be connected to the monitoring server 100.

The media reader 106 is a reading device that reads programs and data from a recording medium 33. As the recording medium 33, for example, a magnetic disk, such as a flexible disk (FD), a HDD, etc., an optical disc, such as a Compact Disc (CD), a Digital Versatile Disc (DVD), etc., a Magneto-Optical disk (MO), a semiconductor memory, etc., may be used. The media reader 106 stores programs and data read from the recording medium 33 into the RAM 102 or HDD 103.

The communication interface 107 is connected to the network 20, and is designed to communicate with electronic devices (business server 21, storage 22, communication device 23, etc.) used in business, the client 24, and the management server 25 over the network 20. The communication interface 107 may be a wired communication interface connected to a communication device with a cable or a wireless communication interface connected to a base station with a radio link.

In this connection, the monitoring server 100 may be configured without the media reader 106. In addition, the monitoring server 100, if controllable from a terminal device, may be configured without the video signal processing unit 104 or the input signal processing unit 105. In addition, the display 31 and input device 32 may be integrally formed with the case of the monitoring server 100. The business server 21, client 24, and management server 25 may be implemented with the same hardware as the monitoring server 100.

Figure 7:
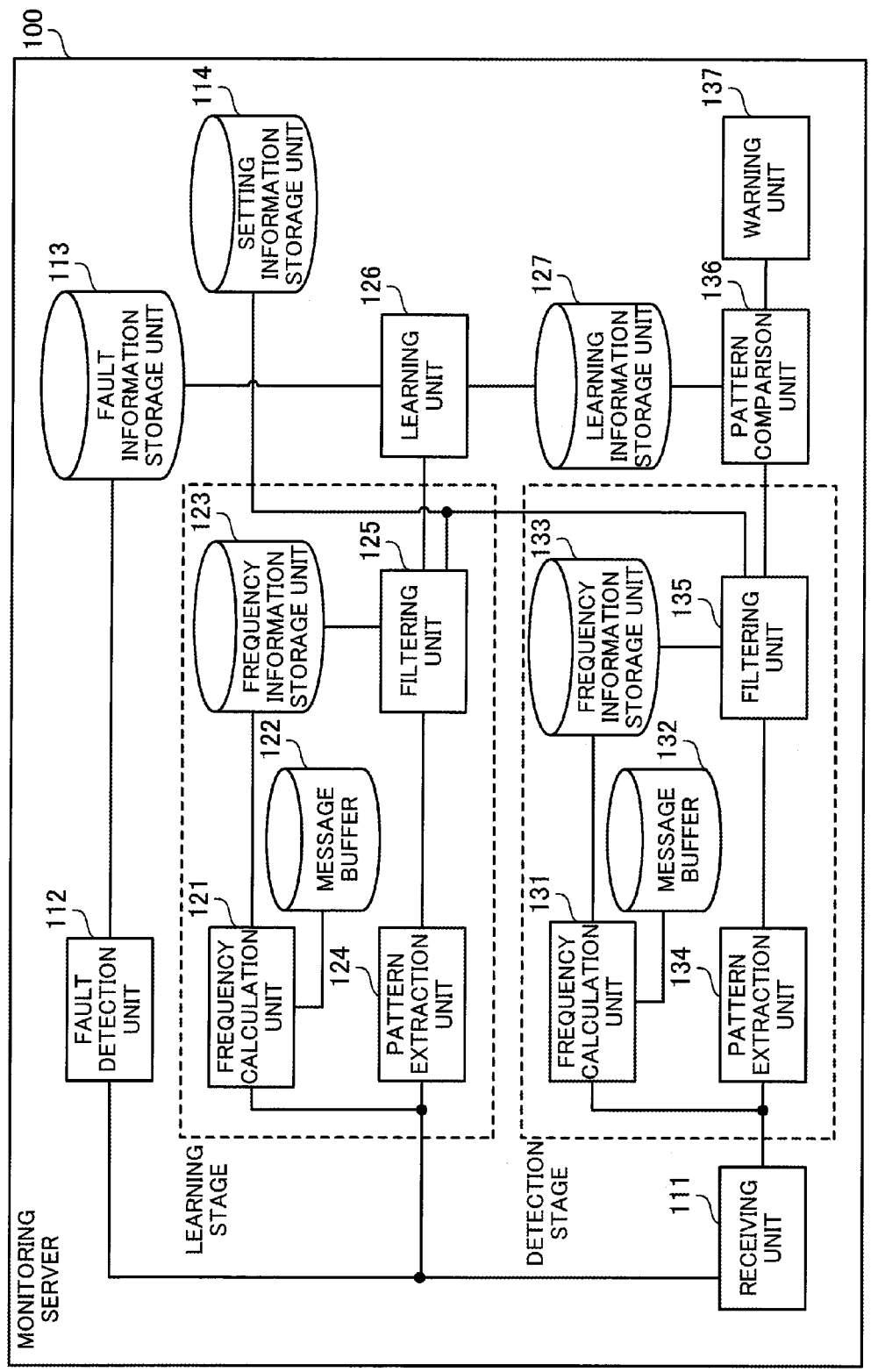
FIG. 7 is a block diagram illustrating an example of the functions of the monitoring server.

FIG. 7 is a block diagram illustrating an example of the functions of the monitoring server.

The monitoring server 100 includes a receiving unit 111, a fault detection unit 112, a fault information storage unit 113, and a setting information storage unit 114. In addition, the monitoring server 100 includes a frequency calculation unit 121, a message buffer 122, a frequency information storage unit 123, a pattern extraction unit 124, a filtering unit 125, a learning unit 126, and a learning information storage unit 127. The monitoring server 100 further includes a frequency calculation unit 131, a message buffer 132, a frequency information storage unit 133, a pattern extraction unit 134, a filtering unit 135, a pattern comparison unit 136, and a warning unit 137.

The fault information storage unit 113, setting information storage unit 114, message buffers 122 and 132, frequency information storage units 123 and 133, and learning information storage unit 127 are implemented by using, for example, storage areas prepared in the RAM 102 or the HDD 103. The other units are implemented as, for example, program modules to be executed by the CPU 101.

The receiving unit 111 receives messages from electronic devices including the business server 21, storage 22, communication device 23 and so on. Messages received by the receiving unit 111 may include messages from a plurality of electronic devices or a plurality of kinds of electronic devices. The receiving unit 111 appends a timestamp indicating the reception time to each message. However, in the case where each message includes information indicating the generation or transmission time thereof, such a timestamp do not need to be appended.

The fault detection unit 112 obtains messages from the receiving unit 111 and determines their message types. If an obtained message indicates a fault, such as a HDD fault, an abnormal termination of server software, etc., the fault detection unit 112 generates fault information indicating the occurrence of the fault. The fault information indicates the time appended to a message as the occurrence time of the fault, the details of the fault, and so on. The fault detection unit 112 stores the generated fault information in the fault information storage unit 113.

The fault information storage unit 113 stores therein fault information associating the details of each past fault and the occurrence time of the fault with each other. The fault information may be entered by the fault detection unit 112 or may be entered from the client 24 in accordance with administrator's operations. The setting information storage unit 114 stores therein user setting information indicating message types that the administrator considers to have a high relevance to faults and message types that the administrator considers to have a low relevance to faults. The user setting information is entered from the client 24 in accordance with administrator's operations.

The frequency calculation unit 121 obtains messages from the receiving unit 111, manages a set of messages obtained for the most recent predetermined time period (for example, 24 hours), and successively calculates the appearance frequency for each message type. When obtaining a message from the receiving unit 111, the frequency calculation unit 121 adds the obtained message to the message buffer 122, and deletes messages older than a predetermined time period from the message buffer 122. Then, the frequency calculation unit 121 generates frequency information indicating the appearance frequencies of the individual message types from the set of messages stored in the message buffer 122, and stores the generated frequency information in the frequency information storage unit 123.

The message buffer 122 is a buffer area for holding messages collected by the monitoring server 100 for a predetermined time period. The frequency information storage unit 123 stores therein frequency information that associates an appearance frequency and a score calculated based on the appearance frequency with each message type. The score is the reciprocal of an appearance probability. A smaller score indicates a higher appearance frequency, and a higher score indicates a smaller appearance frequency. The frequency information is successively updated by the frequency calculation unit 121.

The pattern extraction unit 124 obtains messages from the receiving unit 111, holds the messages for the time period (for example, five minutes) of the sliding window, and extracts a message pattern. When obtaining a message from the receiving unit 111, the pattern extraction unit 124 shifts the sliding window so as to include the obtained message, and deletes old messages outside the sliding window (for example, messages older than five minutes). Then, the pattern extraction unit 124 extracts a message pattern listing the message types falling within the sliding window, and outputs the message pattern to the filtering unit 125.

The filtering unit 125 removes background noise from the extracted pattern with reference to the latest frequency information stored in the frequency information storage unit 123 and the user setting information stored in the setting information storage unit 114. When obtaining a pattern from the pattern extraction unit 124, the filtering unit 125 searches for message types whose scores are less than or equal to a threshold (message types whose appearance probabilities are greater than or equal to a threshold) from the pattern. Then, the filtering unit 125 determines the found message types as background noise and removes them from the pattern. Note that, with reference to the user setting information, the filtering unit 125 does not remove the message types that are specified as having a high relevance to faults, and removes the message types that are specified as having a low relevance to faults. The filtering unit 125 outputs the filtered pattern to the learning unit 126.

The learning unit 126 generates learning information indicating a correlation between the filtered pattern and a fault, with reference to the fault information stored in the fault information storage unit 113, and stores the learning information in the learning information storage unit 127. When obtaining a pattern from the filtering unit 125, the learning unit 126 determines whether a fault has occurred within a predetermined time period after the appearance of the obtained pattern. As the time of the appearance of a pattern, the end time of the sliding window or the reception time of the last message falling within the sliding window, or the like may be used. The learning unit 126 counts how many times the same pattern appeared and how many times a fault occurred within the predetermined time period after the appearance of the pattern, and successively updates the co-occurrence probability between the pattern and the fault.

In this connection, the pattern extraction unit 124, filtering unit 125, and learning unit 126 may perform learning using messages immediately when receiving a message. However, to calculate the co-occurrence probability between a pattern and a fault, the learning unit 126 needs to wait for at least a predetermined time period after extracting the pattern. Alternatively, the pattern extraction unit 124, filtering unit 125, and learning unit 126 may perform learning using messages after a certain time period has passed since the reception of a message, as in the case of a batch process. In addition, in the second embodiment, background noise is removed after a pattern is extracted from a set of messages. Alternatively, a pattern may be extracted after background noise is removed from a set of messages.

The frequency calculation unit 121, message buffer 122, frequency information storage unit 123, pattern extraction unit 124, and filtering unit 125 relate to a learning stage. On the other hand, the frequency calculation unit 131, message buffer 132, frequency information storage unit 133, pattern extraction unit 134, and filtering unit 135 relate to a detection stage and correspond to the learning stage.

The frequency calculation unit 131 obtains messages from the receiving unit 111, manages a set of messages obtained for a most recent predetermined time period, and successively calculates an appearance frequency for each message type. The message buffer 132 is a buffer area for holding collected messages for a predetermined time period. The frequency information storage unit 133 stores therein frequency information that associates an appearance frequency and a score calculated based on the appearance frequency with each message type. The pattern extraction unit 134 obtains messages from the receiving unit 111, holds the messages for the time period of the sliding window, and extracts a message pattern. The filtering unit 135 removes background noise from the extracted pattern with reference to the latest frequency information stored in the frequency information storage unit 133 and the user setting information stored in the setting information storage unit 114.

The pattern comparison unit 136 detects a fault symptom with reference to the learning information stored in the learning information storage unit 127. When obtaining a pattern from the filtering unit 135, the pattern comparison unit 136 searches the learning information for the obtained pattern. The background noise determined at the time of learning has been removed from the patterns indicated in the learning information, and the background noise currently determined has been removed from the currently obtained pattern. If a co-occurrence probability between an obtained pattern and a fault is greater than or equal to a threshold (for example, 80%), the pattern comparison unit 136 determines that there is a fault symptom, that is, there is a high possibility that a fault will occur within a predetermined time period from the present time.

When the pattern comparison unit 136 detects a fault symptom, the warning unit 137 warns the system administrator. For example, the warning unit 137 generates warning information indicating the fault symptom and sends the warning information to the client 24. The warning unit 137 may display the warning information on the display 31 connected to the monitoring server 100. The warning information includes, for example, messages from which the fault symptom has been detected.

FIG. 8 illustrates an example of a message table.

The message table 141 contains a plurality of received messages. As tables corresponding to the message table 141, a message table containing messages for a predetermined time period (for example, 24 hours) is stored in the message buffers 122 and 123. In addition, a message table containing messages falling within the time period (for example, five minutes) of the sliding window is held in the pattern extraction units 124 and 134. The message table 141 includes the following fields: Time, Type, and Message.

The Time field indicates the time at which the receiving unit 111 received a message. In the case where a transmission-source electronic device appends the generation or transmission time to a message, the generation or transmission time may be recorded in the Time field. The Type field contains identification information indicating the message type of the message. Messages are classified into a plurality of types according to causes like the following: a failure in detection of Redundant Arrays of Independent Disks (RAID) interface, a counter overflow, a failure in detection of a disk. The identification information indicating a message type may be appended to the message by a transmission-source electronic device or by the receiving unit 111. The Message field contains the details of the problem indicated in the message.

FIG. 9 illustrates an example of a frequency table.

The frequency table 142 contains frequency information that associates an appearance frequency and a score calculated based on the appearance frequency with each message type. As tables corresponding to the frequency table 142, a frequency table is stored in the frequency information storage units 123 and 133. The frequency table 142 includes the following fields: Type, Appearance Count, Total, Frequency, and Score.

The Type field contains identification information indicating a message type. The Appearance Count field indicates the number of received messages of the type as an appearance count. The Total field indicates the total number of received messages of all types as a total count. The Frequency field indicates the appearance probability of messages of the type as an appearance frequency. The appearance probability of messages of a certain type is calculated by dividing the appearance count of messages of the type by the total count of messages of all types. The Score field contains an index value of the message type. A lower index value indicates a higher appearance frequency, and a higher index value indicates a lower appearance frequency. The score may be calculated as, for example, the reciprocal of the appearance probability.

The appearance count and total count registered in the frequency table stored in the frequency information storage unit 123 are calculated based on a set of messages obtained within a predetermined time period (for example, 24 hours), stored for use in learning in the message buffer 122. When a set of messages stored in the message buffer 122 is changed because a new message is received or the like, the appearance count, total count, frequency, and score are updated. On the other hand, the appearance count and total count registered in the frequency table stored in the frequency information storage unit 133 are calculated based on a set of messages obtained within a most recent predetermined time period (for example, most recent 24 hours), stored in the message buffer 132. When a set of messages stored in the message buffer 132 is changed because a new message is received or the like, the appearance count, total count, frequency, and score are updated.

FIG. 10 illustrates an example of a user setting table.

The user setting table 143 contains user setting information generated by the administrator. The user setting table 143 is stored in the setting information storage unit 114. The user setting table 143 includes the following fields: Type, Exception Flag, and Non-Exception Flag.

The Type field contains identification information indicating a message type. The Exception flag contains a flag indicating whether the administrator considers that the message type has a low relevance to a fault or not. The message types considered to have a low relevance to faults are determined as background noise even if their appearance frequencies are low (high score), and the message types are removed from extracted patterns. The Non-Exception flag field contains a flag indicating whether the administrator considers that the message type has a high relevance to a fault or not. The message types considered to have a high relevance to faults are determined to be not background noise even if their appearance frequencies are high (low score), and the message types are not removed from extracted patterns.

FIG. 11 illustrates an example of a fault table.

A fault table 144 contains fault information generated by the fault detection unit 112 or the administrator. The fault table 144 is stored in the fault information storage unit 113, and includes the following fields: Time and Fault.

The Time field indicates the time at which a fault occurred. In the case where fault information is generated based on a message indicating the occurrence of a fault, the generation or transmission time indicated in the message, the reception time of the message by the receiving unit 111, or the like may be used as the occurrence time of the fault. The Fault field contains the details of the fault. The details of faults may be, for example, a HDD failure, performance degradation, no response from Web server, or the like.

FIG. 12 illustrates an example of a learning table.

A learning table 145 contains learning information generated by the learning unit 126. The learning table 145 is stored in the learning information storage unit 127. The learning table 145 includes the following fields: Pattern, Fault, Appearance Count, Symptom Count, and Co-occurrence Probability.

The Pattern field contains a message pattern indicating a combination of message types that were received in the same time period. To extract patterns, the order the messages appeared within the sliding window may not be considered. In addition, to extract patterns, the number of messages of the same type may not be considered even if two or more messages of the same type fall within the sliding window. For example, patterns are expressed, like [1, 3, 4, 7, 9], [1, 4, 6, 10, 12], [3, 7, 11, 14], using the identification information of the message types. The patterns registered in the learning table 145 do not include message types that were determined as background noise at the time of learning.

The Fault field contains the details of a fault that occurred within a predetermined time period after the pattern appeared, among the details of the faults registered in the fault table 144. The Appearance Count field indicates how many times the pattern appeared in the past, as an appearance count. The Symptom Count field indicates how many times the fault occurred within a predetermined time period after the pattern appeared, as a symptom count. The Co-occurrence Probability field contains a probability indicating a correlation between the pattern and the fault. A higher co-occurrence probability indicates a higher correlation. For example, the co-occurrence probability may be calculated by dividing the symptom count by the appearance count.

The following describes how the monitoring server 100 performs information processing.

Figure 13:
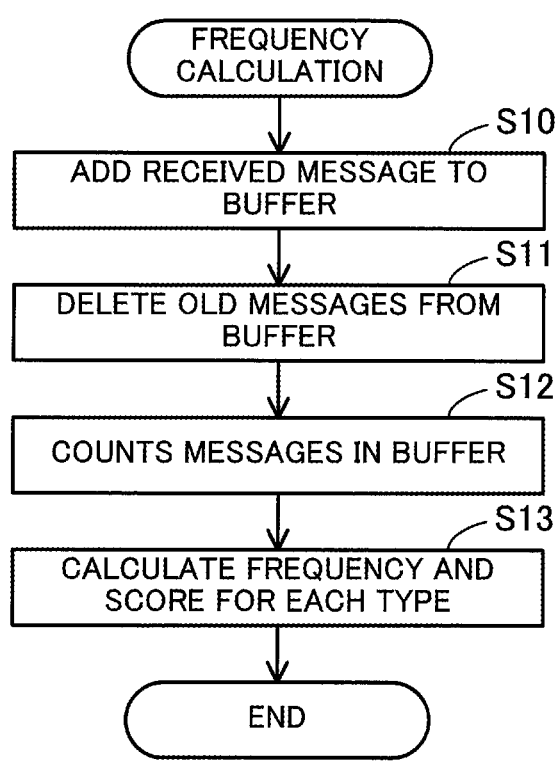
FIG. 13 is a flowchart illustrating an example of a frequency calculation procedure.

FIG. 13 is a flowchart illustrating an example of a frequency calculation procedure.

As the learning stage, this frequency calculation unit 121 performs this frequency calculation procedure each time the frequency calculation unit 121 receives a message from the receiving unit 111. As the detection stage, the frequency calculation unit 131 performs the same frequency calculation procedure as performed by the frequency calculation unit 121 each time the frequency calculation unit 131 receives a message from the receiving unit 111.

(S10) The frequency calculation unit 121 stores a message (newly received message) obtained from the receiving unit 111 in the message buffer 122.

(S11) The frequency calculation unit 121 searches the message buffer 122 to find messages older than a predetermined time period (for example, 24 hours) before the present time, and deletes the found messages.

(S12) The frequency calculation unit 121 counts the total number of messages (total count) stored in the message buffer 122, i.e., messages collected for a most recent predetermined time period. The frequency calculation unit 121 also determines the types of the messages and counts the number of messages (appearance count) stored in the message buffer 122 for each type.

(S13) The frequency calculation unit 121 registers the total count and appearance count of each type, calculated at step S12, in the frequency table of the frequency information storage unit 123. The frequency calculation unit 121 calculates the frequency and score for each type on the basis of the total count and the appearance counts of the individual types, and registers them in the frequency table. For example, the frequency is calculated as "frequency"="appearance count"÷"total count", and the score is calculated as the reciprocal of the frequency.

In this way, the frequency calculation unit 121 at the learning stage successively updates the appearance frequency and score for each message type at the time of learning in response to reception of a new message. In this connection, the frequency calculation unit 121 may perform the frequency calculation when a certain time period has passed since the reception of a message or when a certain amount of messages is accumulated. On the other hand, the frequency calculation unit 131 at the detection stage successively updates the appearance frequency and score for each message type at the present time (detection time) in response to arrival of a new message.

Figure 14:
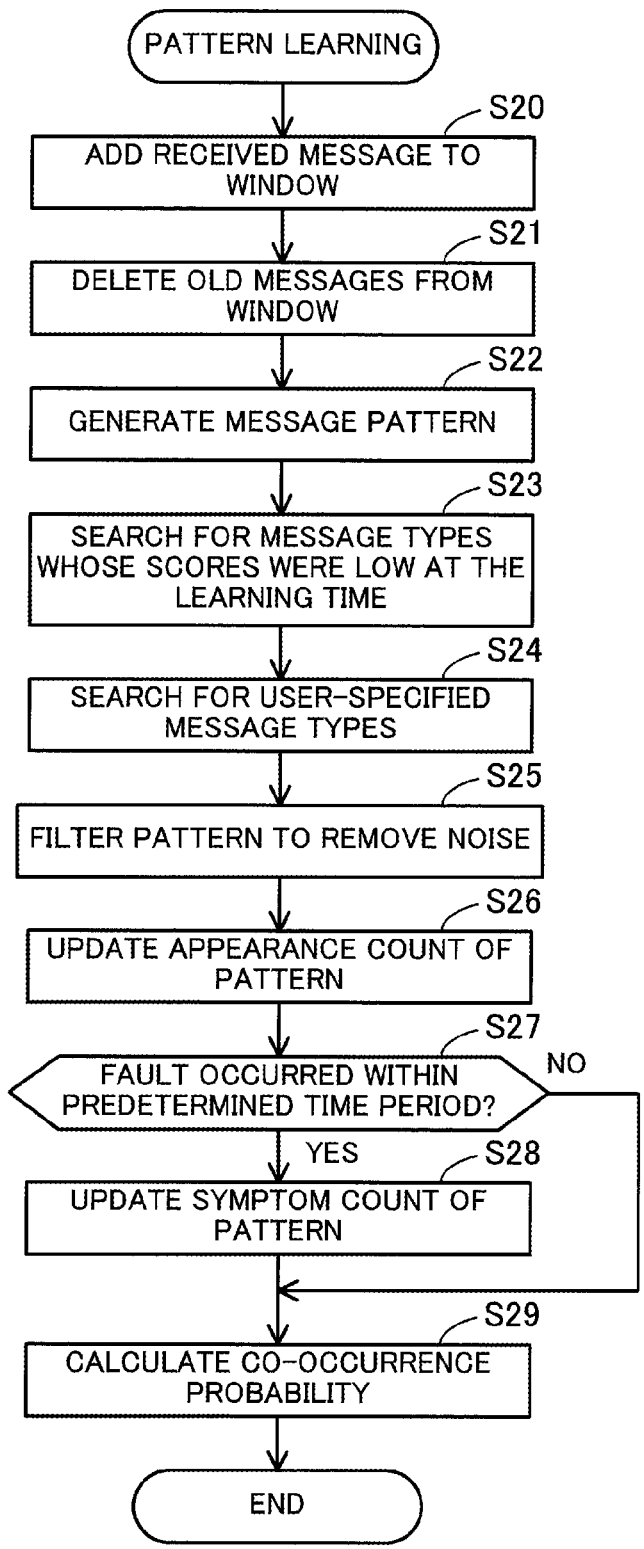
FIG. 14 is a flowchart illustrating an example of a pattern learning procedure.

FIG. 14 is a flowchart illustrating an example of a pattern learning procedure.

As the learning stage, this pattern learning procedure is performed each time the pattern extraction unit 124 obtains a message from the receiving unit 111. However, this procedure may be performed when a certain time period has passed since the reception of a message or when a certain amount of messages is accumulated.

(S20) The pattern extraction unit 124 adds a message (newly received message) obtained from the receiving unit 111 to the sliding window.

(S21) The pattern extraction unit 124 shifts the sliding window forwards according to the addition of the new message, and deletes old messages outside the sliding window. That is to say, the pattern extraction unit 124 searches the stored messages to find messages older than the time period (for example, five minutes) of the sliding window before the reception time of the new message, and deletes the found old messages.

(S22) The pattern extraction unit 124 determines message types falling within the sliding window, and generates a pattern listing the message types.

(S23) The filtering unit 125 searches the plurality of message types included in the pattern generated at step S22 to find message types whose scores are lower than or equal to a threshold, with reference to the frequency table stored in the frequency information storage unit 123.

(S24) The filtering unit 125 searches the plurality of message types included in the pattern generated at step S22 to find message types specified by the administrator, with reference to the user setting table 143 stored in the setting information storage unit 114. The specified message types include the message types to be removed as background noise and the message types not to be removed because these are not background noise, irrespective of the scores calculated at step S13 described earlier.

(S25) The filtering unit 125 filters the pattern generated at step S22 to remove some message types taken as background noise. More specifically, the filtering unit 125 removes the message types whose scores are low from the generated pattern. At this time, with reference to the user setting table 143, the filtering unit 125 does not remove the message types that are not specified as background noise, and removes the message types that are specified as background noise.

(S26) The learning unit 126 increments the appearance count of the pattern output from the filtering unit 125 in the learning table 145 stored in the learning information storage unit 127.

(S27) The learning unit 126 determines whether a fault occurred within a predetermined time period after the appearance of the pattern output from the filtering unit 125, with reference to the fault table 144 stored in the fault information storage unit 113. As the time of the appearance of a pattern, for example, the end time of the sliding window, the reception time of the last message falling within the sliding window, or the like may be used. When a fault occurred within the predetermined time period, the process proceeds to step S28. Otherwise, the process proceeds to step S29.

(S28) The learning unit 126 increments the symptom count of the pattern output from the filtering unit 125 in the learning table 145. In this connection, the Fault field in the learning table 145 contains the details of the fault that is indicated in the fault table 144 and that occurred within the predetermined time period after the appearance of the pattern.

(S29) The learning unit 126 updates the co-occurrence probability of the pattern output from the filtering unit 125, in the learning table 145. When the determination at step S27 is affirmative, the co-occurrence probability is calculated by dividing the symptom count updated at step S28 by the appearance count updated at step S26. If the determination at step S27 is negative, then the co-occurrence probability is calculated by dividing the current symptom count, which was not be updated, by the appearance count updated at step S26.

Figure 15:
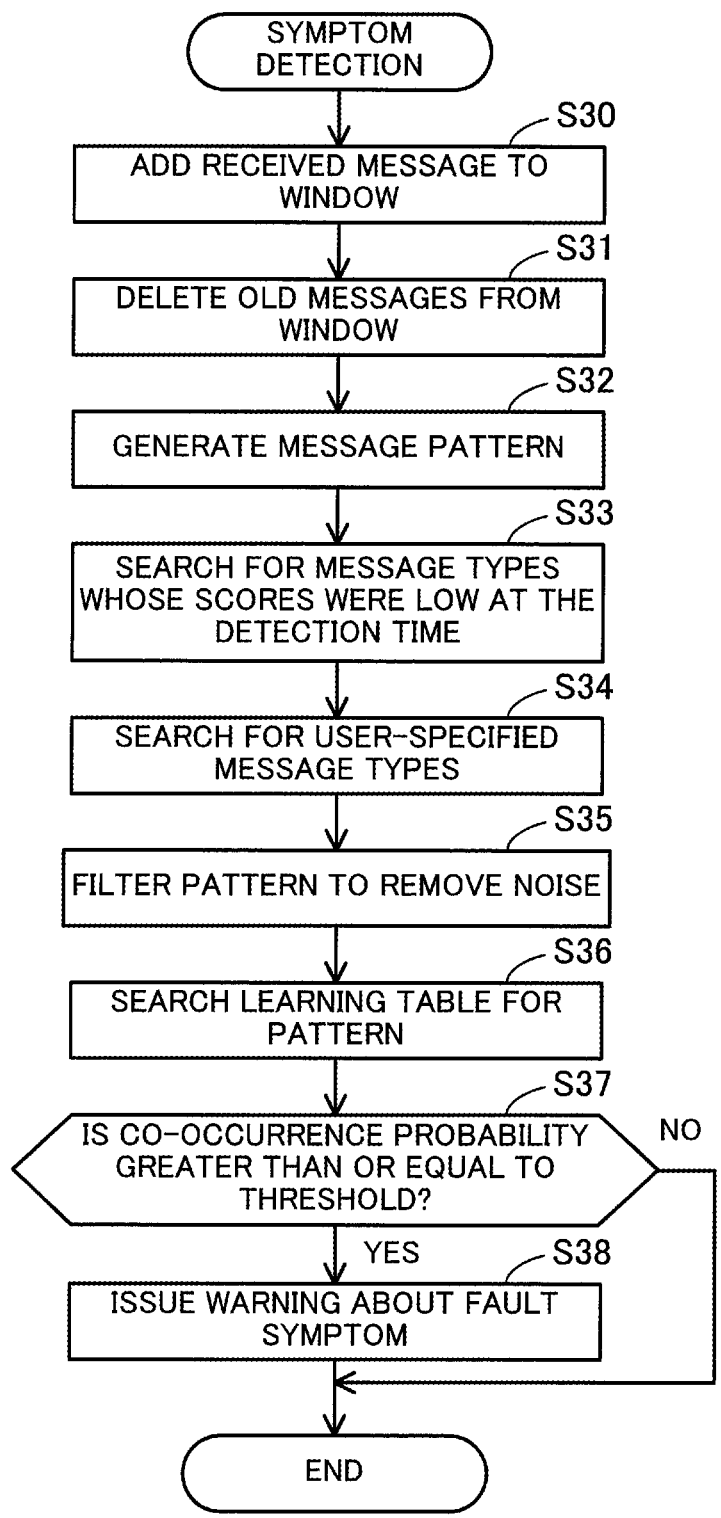
FIG. 15 is a flowchart illustrating a symptom detection procedure.

FIG. 15 is a flowchart illustrating a symptom detection procedure.

As the detection stage, this symptom detection procedure is performed each time the pattern extraction unit 134 obtains a message from the receiving unit 111 (preferably, in real-time).

(S30) The pattern extraction unit 134 adds a message (newly received message) obtained from the receiving unit 111 to the sliding window.

(S31) The pattern extraction unit 134 shifts the sliding window forward according to the addition of the new message, and deletes old messages outside the sliding window. That is, the pattern extraction unit 134 searches the stored messages to find messages older than the time period (for example, five minutes) of the sliding window before the reception time of the new message, and deletes the found old messages.

(S32) The pattern extraction unit 134 determines the message types falling within the sliding window, and generates a pattern listing the message types.

(S33) The filtering unit 135 searches the plurality of message types included in the pattern generated at step S32 to find message types whose scores are lower than or equal to a threshold, with reference to the frequency table stored in the frequency information storage unit 133. There is a possibility that message types whose scores are lower than or equal to the threshold (whose appearance frequencies are greater than or equal to a threshold) may be different between a previous time of updating the learning table 145 (learning time) and the present time (detection time).

(S34) The filtering unit 135 searches the plurality of message types included in the pattern generated at step S32 to find message types specified by the administrator, with reference to the user setting table 143 stored in the setting information storage unit 114.

(S35) The filtering unit 135 filters the pattern generated at step S32 to remove some message types taken as background noise. More specifically, the filtering unit 135 removes message types whose scores are low from the pattern. At this time, with reference to the user setting table 143, the filtering unit 135 does not remove message types that are not specified as background noise, and removes message types that are specified as background noise.

(S36) The pattern comparison unit 136 searches the learning table 145 stored in the learning information storage unit 127 to find the pattern output from the filtering unit 135.

(S37) The pattern comparison unit 136 determines whether the pattern output from the filtering unit 135 is registered in the learning table 145 and also the co-occurrence probability of the pattern is greater than or equal to the threshold. If these conditions are satisfied, the pattern comparison unit 136 determines that there is a fault symptom in the monitored system, and then the process proceeds to step S38. If these conditions are not satisfied (the pattern output from the filtering unit 135 is not registered in the learning table 145 or the co-occurrence probability of the pattern is lower than the threshold), the pattern comparison unit 136 determines that there is no fault symptom.

(S38) The warning unit 137 warns the administrator about the fault symptom. For example, the warning unit 137 generates warning information indicating the fault symptom and sends the warning information to the client 24.

According to the information processing system of the second embodiment, the background noise for the learning time is determined based on the appearance frequencies of the individual message types obtained at the time of learning, and then a message pattern is learned by removing the background noise. Then, the background noise for the detection time is determined based on the appearance frequencies of the individual message types obtained at the time of detection, and a message pattern generated by removing the background noise is compared with the learning result. This approach makes it possible to detect a fault symptom using the existing learning results even if the background noise changes according to changes in the configuration of a monitored system, changes in business processes, or the like. Therefore, the load for re-learning may be minimized and the accuracy of the fault symptom detection may be improved. In addition, the second embodiment successively updates the frequency information, which makes it possible to deal with changes in background noise swiftly and to improve the accuracy of learning and also the accuracy of fault symptom detection.

Third Embodiment

The following describes a third embodiment. The following mainly describes the differential features from the above-described second embodiment, and the same features as the second embodiment will not be described again. The information processing system of the third embodiment is implemented with the same configuration as FIG. 2. However, the information processing system of the third embodiment includes a monitoring server 100*a*, as described below, in place of the monitoring server 100. The monitoring server 100*a* learns correlations between message patterns and faults and updates the appearance frequency of each message type, at different times from the monitoring server 100.

Figure 16:
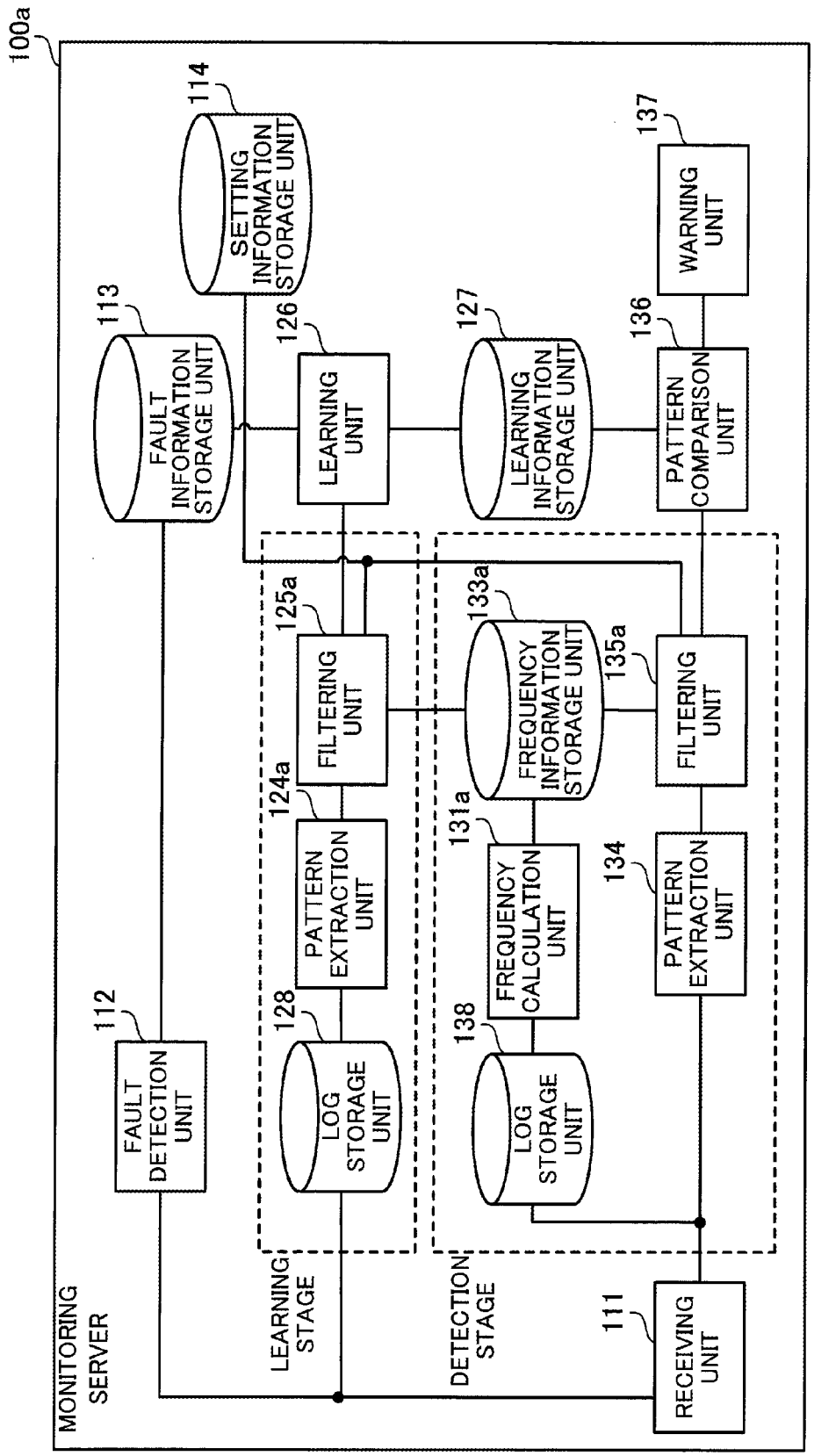
FIG. 16 is a block diagram illustrating another example of the functions of the monitoring server.

FIG. 16 is a block diagram illustrating another example of the functions of a monitoring server.

The monitoring server 100*a* includes a receiving unit 111, a fault detection unit 112, a fault information storage unit 113, and a setting information storage unit 114. In addition, the monitoring server 100*a* includes a pattern extraction unit 124*a*, a filtering unit 125*a*, a learning unit 126, a learning information storage unit 127, and a log storage unit 128. The monitoring server 100*a* further includes a frequency calculation unit 131*a*, a frequency information storage unit 133*a*, a pattern extraction unit 134, a filtering unit 135*a*, a pattern comparison unit 136, a warning unit 137, and a log storage unit 138. The following describes units different from those of the monitoring server 100 of the second embodiment among the units of the monitoring server 100*a*.

The log storage unit 128 stores therein a log file including messages received by the receiving unit 111. When the receiving unit 111 receives a new message, the message is additionally stored in the log file. The message is deleted when used by the pattern extraction unit 124*a*.

The pattern extraction unit 124*a* extracts a message pattern from a set of messages included in the log file by processing the log file stored in the log storage unit 128 with the batch method. For example, each time reading one message from the log file, the pattern extraction unit 124*a* shifts the sliding window, and generates a pattern listing the message types falling within the sliding window. After reading all messages, the pattern extraction unit 124*a* initializes the log file (deletes messages).

Since the batch method is employed, the pattern extraction unit 124*a* processes the log file intermittently. The times for processing the log file may be, for example, the times at which the configuration of a monitored system is changed. A change in the system configuration is detected by sending an inquiry to a management server 25. In addition, the times for processing the log file may be the times at predetermined intervals (24 hours, one month) or may be predetermined times.

The filtering unit 125*a* removes background noise from the pattern extracted by the pattern extraction unit 124*a* with reference to the frequency information stored in the frequency information storage unit 133*a* and the user setting information stored in the setting information storage unit 114. As will be described later, frequency information for a plurality of different time periods is stored in the frequency information storage unit 133*a*. The filtering unit 125*a* selects and uses the frequency information for a time period corresponding to the currently processed log file.

More specifically, the filtering unit 125*a* searches the pattern to find message types whose scores are lower than or equal to a threshold (message types whose appearance probabilities are greater than or equal to a threshold). At this time, the filtering unit 125*a* refers to the frequency information for the time period corresponding to the log file (the same generation as the log file) from the frequency information for a plurality of time periods (plural generations). Then, the filtering unit 125*a* determines the found message types as background noise, and removes them from the pattern. At this time, with reference to the user setting information, the filtering unit 125*a* does not remove the message types which are specified as having a high relevance to faults, and removes the message types which are specified as having a low relevance to faults.

The log storage unit 138 stores therein the log file including messages received by the receiving unit 111. When receiving a new message by the receiving unit 111, the message is added to the log file. Messages are deleted when used by the frequency calculation unit 131*a*.

The frequency calculation unit 131*a* processes the log file stored in the log storage unit 138 with the batch method to calculate an appearance frequency for each message type on the basis of a set of messages included in the log file. The frequency calculation unit 131*a* reads messages from the log file one by one, generates frequency information indicating the appearance frequency of each message type, and stores the frequency information in association with period information indicating the time period of the messages used for the frequency calculation (the generation of the log file), in the frequency information storage unit 133*a*. After reading all messages, the frequency calculation unit 131*a* initializes the log file stored in the log storage unit 138 (deletes the messages).

In this connection, the times at which the frequency calculation unit 131*a* processes a log file may be the same as or different from the times at which the pattern extraction unit 124*a* processes a log file. For example, the times for frequency calculation may be the times at which the configuration of the monitored system is changed, the times at predetermined intervals (for example, 24 hours or one month), predetermined times, or the like.

The frequency information storage unit 133*a* stores therein the frequency information that associates an appearance frequency and a score calculated based on the appearance frequency with each message type, in each execution of the batch process. That is to say, the frequency information storage unit 133*a* stores therein the frequency information for a plurality of time periods (a plurality of generations) calculated on the basis of sets of messages falling within a plurality of different time periods. In addition, the frequency information storage unit 133*a* stores therein the period information for managing which time period each piece of the frequency information corresponds to.

The filtering unit 135*a* removes background noise from the pattern extracted by the pattern extraction unit 134 with reference to the frequency information stored in the frequency information storage unit 133*a* and the user setting information stored in the setting information storage unit 114. At this time, out of the frequency information for a plurality of time periods stored in the frequency information storage unit 133*a*, the latest frequency information is used.

FIG. 17 illustrates an example of a period table.

The period table 146 contains period information generated by the frequency calculation unit 131*a*. The period table 146 is stored in the frequency information storage unit 133*a*. The period table 146 includes the following fields: Period, Start Time, and End Time.

The Period field contains identification information identifying a set of messages (the generation of a log file) used for generating frequency information. The Start Time field indicates the reception time of the earliest message among the set of messages used for generating the frequency information. In this connection, in the Start Time filed, the last execution time of the batch process, the time at which reception of messages was restarted after the last execution of the batch process, or another time may be registered. The End Time field indicates the reception time of the last message among the set of messages used for generating the frequency information. In this connection, in the End Time field, the current execution time of the batch process may be registered.

Figure 18:
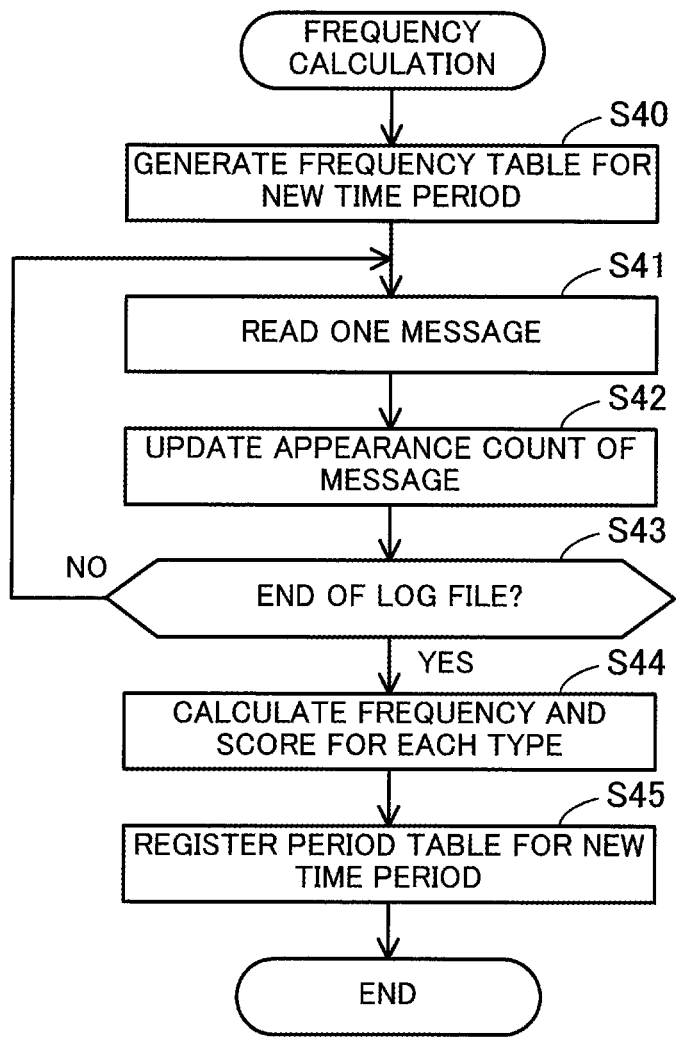
FIG. 18 is a flowchart illustrating another example of the frequency calculation procedure.

FIG. 18 is a flowchart illustrating another example of the frequency calculation procedure.

(S40) When the time to generate frequency information has come, the frequency calculation unit 131*a* generates a frequency table for a new time period (new generation) and stores the frequency table in the frequency information storage unit 133*a*.

(S41) The frequency calculation unit 131*a* reads one message from the log file stored in the log storage unit 138. At this time, the messages are read in order from the first one of the log file. Alternatively, at this step S41, the messages may be read in a desired order.

(S42) The frequency calculation unit 131*a* increments the total count for the message in the frequency table. In addition, the frequency calculation unit 131*a* determines the type of the read message, and increments the appearance count corresponding to the determined type in the frequency table.

(S43) The frequency calculation unit 131*a* determines whether the end of the log file has been reached, i.e., whether all of the messages included in the log file have been read. If the end of the log file has been reached, the process proceeds to step S44. Otherwise, the process proceeds back to step S41.

(S44) The frequency calculation unit 131a calculates the appearance frequency and the score for each type on the basis of the total count of messages and the appearance counts of the individual types, indicated in the frequency table, and registers them in the frequency table. For example, the appearance frequency is calculated as "appearance frequency"="appearance count"÷"total count", and the score is calculated as the reciprocal of the appearance frequency.

(S45) The frequency calculation unit 131a registers the identification information of the new time period and the start time and end time indicating the time period in the period table 146 stored in the frequency information storage unit 133a.

Figure 19:
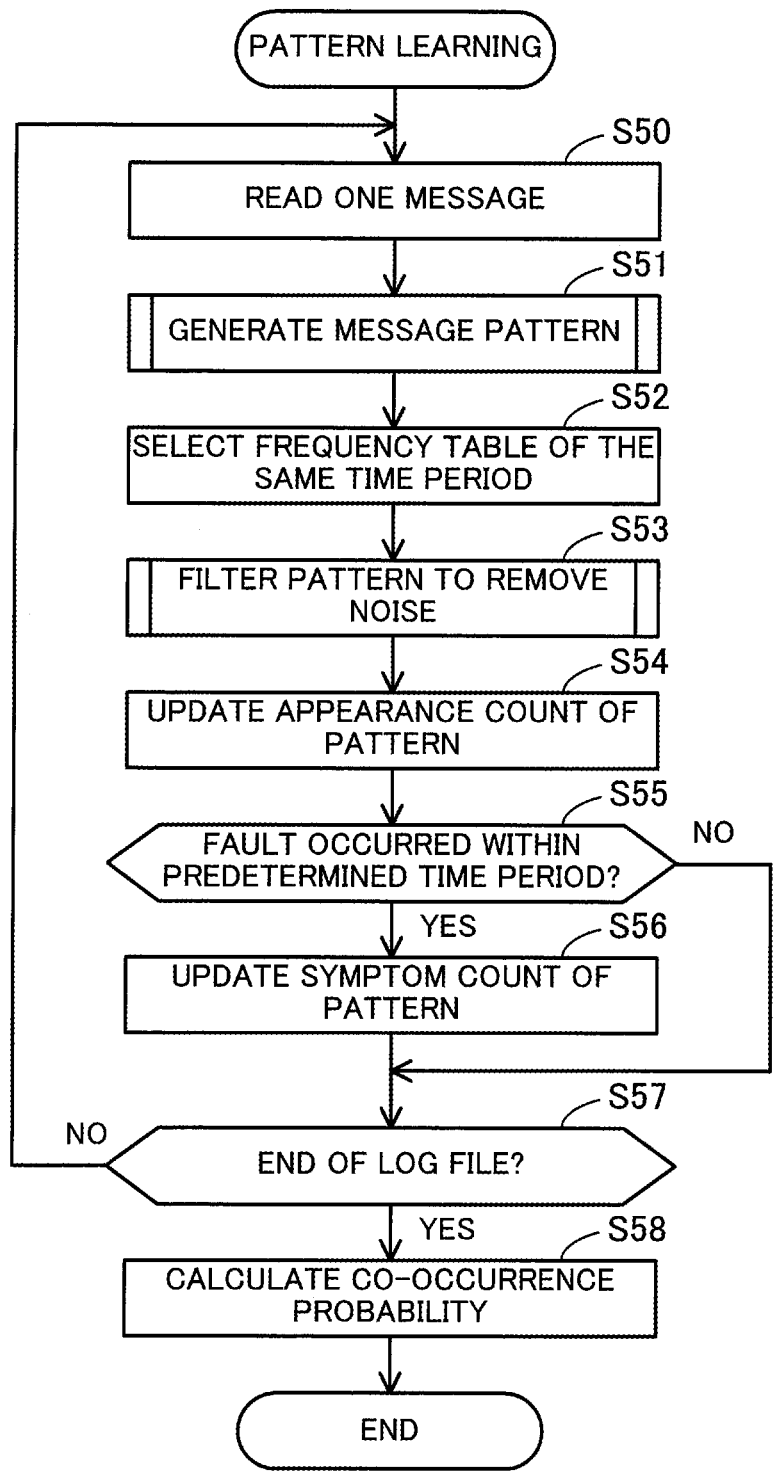
FIG. 19 is a flowchart illustrating another example of the pattern learning procedure.

FIG. 19 is a flowchart illustrating another example of the pattern learning procedure.

(S50) When the time for learning has come, the pattern extraction unit 124a reads one message from the log file stored in the log storage unit 128. At this time, the messages are read in order from the first one of the log file (in order from the one with the earliest reception time).

(S51) The pattern extraction unit 124a generates a message pattern using the sliding window in the same way as steps S20 to S22 of FIG. 14.

(S52) The filtering unit 125a selects a frequency table corresponding to the time period (the same generation as the log file) to which the log file of attention belongs, from the frequency tables for a plurality of time periods (plural generations) stored in the frequency information storage unit 133a. To this end, the filtering unit 125a refers to the period table 146 stored in the frequency information storage unit 133a.

(S53) The filtering unit 125a removes background noise from the pattern generated at step S51 in the same way as steps S23 to S25 of FIG. 14. However, in a process corresponding to step S23, the filtering unit 125a uses the scores of the individual message types (scores for the same time period as the log file) indicated in the frequency table selected at step S52.

(S54) The learning unit 126 increments the appearance count of the pattern output from the filtering unit 125a in the learning table 145 stored in the learning information storage unit 127.

(S55) The learning unit 126 determines with reference to the fault table 144 stored in the fault information storage unit 113 whether a fault occurred within a predetermined time period after the appearance of the pattern output from the filtering unit 125a. If the fault occurred within the predetermined time period, the process proceeds to step S56. Otherwise, the process proceeds to step S57.

(S56) The learning unit 126 increments the symptom count of the pattern output from the filtering unit 125a in the learning table 145.

(S57) The pattern extraction unit 124a determines whether the end of the log file has been reached, that is, whether all of the messages included in the log file have been read. If the end has been reached, the process proceeds to step S58. Otherwise, the process proceeds back to step S50.

(S58) The learning unit 126 updates the co-occurrence probability of each pattern in the learning table 145. The co-occurrence probability is calculated by dividing the symptom count by the appearance count for each pattern.

Similarly to the second embodiment, the information processing system of the third embodiment makes it possible to detect fault symptoms using the exiting learning results even if background noise changes according to changes in the configuration of a monitored system or business processes, or the like. This results in minimizing the load for re-learning and improving the accuracy of fault symptom detection. In addition, the third embodiment updates the frequency information and the learning information with the batch method, which minimizes the load on the monitoring server 100a.

Note that, as described earlier, the information processing of the first embodiment is implemented by causing the information processing apparatus 10 to execute an intended program. The information processing of the second and third embodiments are implemented by causing the monitoring servers 100 and 100a to execute intended programs.

A program may be recorded on a computer-readable recording medium (for example, recording medium 33). As such recording media, for example, magnetic disks, optical discs, magneto-optical disks, semiconductor memories, or others may be used. The magnetic disks include FDs and HDDs. The optical discs include CDs, CD-Rs (Recordable), CD-RWs (Rewritable), DVDs, DVD-Rs, and DVD-RWs. The program may be recorded on portable recording media, which may then be distributed. In this case, the program may be copied (or installed) from a portable-recording medium to a HDD or another recording medium (for example, HDD 103), and then may be executed.

According to one aspect, it is possible to make use of existing learning results even if noise that is included in messages to be collected changes.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A fault symptom detection method in collecting a plurality of types of messages from a monitored system, the method comprising:
   determining, by a processor, a first message type that is not used for learning, based on appearance frequencies of individual message types obtained using a first set of messages collected;
   learning, by the processor, a first message pattern, from which the first message type has been removed, from the first set of messages and fault information, the first message pattern being a message pattern that appears when a fault occurs, the fault information indicating occurrence of faults in the monitored system;
   determining, by the processor, a second message type that is not used for detection, based on appearance frequencies of individual message types obtained using a second set of messages collected after the first set of messages;
   generating, by the processor, a second message pattern, from which the second message type has been removed, from the second set of messages; and
   comparing the first message pattern with the second message pattern to detect a fault symptom in the monitored system.

2. The fault symptom detection method according to claim 1, wherein:

the first message type is a message type whose appearance frequency, calculated using the first set of messages, is greater than or equal to a threshold among a plurality of message types; and the second message type is a message type whose appearance frequency, calculated using the second set of messages, is greater than or equal to a threshold among the plurality of message types.

3. The fault symptom detection method according to claim 1, further comprising:

detecting a change in an operating state of the monitored system; and re-calculating the appearance frequencies of the individual message types in response to the change in the operating state of the monitored system.

4. The fault symptom detection method according to claim 1, further comprising determining that there is a fault symptom in the monitored system when the first message pattern without the first message type and the second message pattern without the second message type are identical to each other.

5. An information processing apparatus comprising:

a memory configured to store a plurality of types of messages collected from a monitored system and fault information indicating occurrence of faults in the monitored system; and a processor configured to perform a process including learning a first message pattern that appears when a fault occurs, from a first set of messages and the fault information, generating a second message pattern from a second set of messages obtained after the first set of messages, and comparing the first message pattern with the second message pattern to detect a fault symptom in the monitored system, wherein:

the process further includes determining a first message type that is not used for learning, based on appearance frequencies of individual message types obtained using the first set of messages, and removing the first message type from the first message pattern, and determining a second message type that is not used for detection, based on appearance frequencies of individual message types obtained using the second set of messages, and removing the second message type from the second message pattern.

6. A non-transitory computer-readable storage medium storing a computer program that causes a computer for collecting a plurality of types of messages from a monitored system to execute a process comprising:

determining a first message type that is not used for learning, based on appearance frequencies of individual message types obtained using a first set of messages collected;

learning a first message pattern, from which the first message type has been removed, from the first set of messages and fault information, the first message pattern being a message pattern that appears when a fault occurs, the fault information indicating occurrence of faults in the monitored system;

determining a second message type that is not used for detection, based on appearance frequencies of individual message types obtained using a second set of messages collected after the first set of messages;

generating a second message pattern, from which the second message type has been removed, from the second set of messages; and comparing the first message pattern with the second message pattern to detect a fault symptom in the monitored system.

* * * * *